United States Patent [19]
Bobbert et al.

[11] Patent Number: 5,458,704
[45] Date of Patent: Oct. 17, 1995

[54] PROCESS FOR THE PRODUCTION OF THICK ARMOUR PLATES

[75] Inventors: Jochen Bobbert, Ratingen; Rudolf Kawalla, Oberhausen; Hans Pircher; Gerd Sussek, Mülheim; Günter Weihrauch, Efringen-Kirchen, all of Germany

[73] Assignee: Thyssen Stahl AG, Duisburg, Germany

[21] Appl. No.: 152,034

[22] Filed: Nov. 12, 1993

[51] Int. Cl.⁶ .................................................. C21D 7/13
[52] U.S. Cl. .................... 148/547; 148/541; 148/638; 148/653; 148/654; 148/335; 148/643
[58] Field of Search ........................ 148/541, 335, 148/547, 638, 643, 653, 654, 660, 661

[56] References Cited

U.S. PATENT DOCUMENTS

| | | | |
|---|---|---|---|
| 3,981,752 | 9/1976 | Kranenberg et al. | 148/335 |
| 4,325,748 | 4/1982 | Nashiwa et al. | 148/541 |
| 4,431,466 | 2/1984 | MeLampy | 148/143 |
| 4,645,720 | 2/1987 | Pircher et al. | 428/683 |
| 5,122,336 | 6/1992 | Roux et al. | 420/108 |

FOREIGN PATENT DOCUMENTS

| | | |
|---|---|---|
| 0142042 | 5/1985 | European Pat. Off. . |
| 0423004 | 4/1991 | European Pat. Off. . |
| 3209531 | 9/1982 | Germany . |
| 4031550 | 4/1992 | Germany . |
| 59-129724 | 11/1984 | Japan . |
| 61-136624 | 6/1986 | Japan . |

OTHER PUBLICATIONS

Stahlschlussel, C. W. Wegst, Edition 15, 1989, Verlag Stahlschlussel Wegst GmbH, Marbach, p. 26, Subject No. 1.6580, 1.6582.

Primary Examiner—David A. Simmons
Assistant Examiner—Sean Vincent
Attorney, Agent, or Firm—Meltzer, Lippe, Goldstein, Wolf, Schlissel & Sazer

[57] ABSTRACT

The invention relates to a process for the production of very hard armour plates from steel slabs, wherein the slabs are hot rolled to a final thickness above 50 mm and then hardened and possibly tempered. The characterizing feature of the invention is that a continuously cast slab is produced from a steel having 0.25 to 0.32% C
0.05 to 0 75% Si
0.10 to 1.50% Mn
0.90 to 2.00% Cr
0.10 to 0.70% Mo
1 20 to 4 50% Ni
0.01 to 0.08% Al
max 0.015% P
max 0.005% S
max 0.012% N residue Fe, including usual impurities, the slab then being heated to a temperature of 1150° C. or higher and heated through, whereafter following cooling in air and by the spraying of its two wide sides with pressurized water, the slab is hot rolled with a surface temperature in the range of 1050° to 900° C. in shaping passes having an individual deformation of $\epsilon_h > 0.1$ and with a shape factor SF>0.40 to the final thickness.

13 Claims, 1 Drawing Sheet

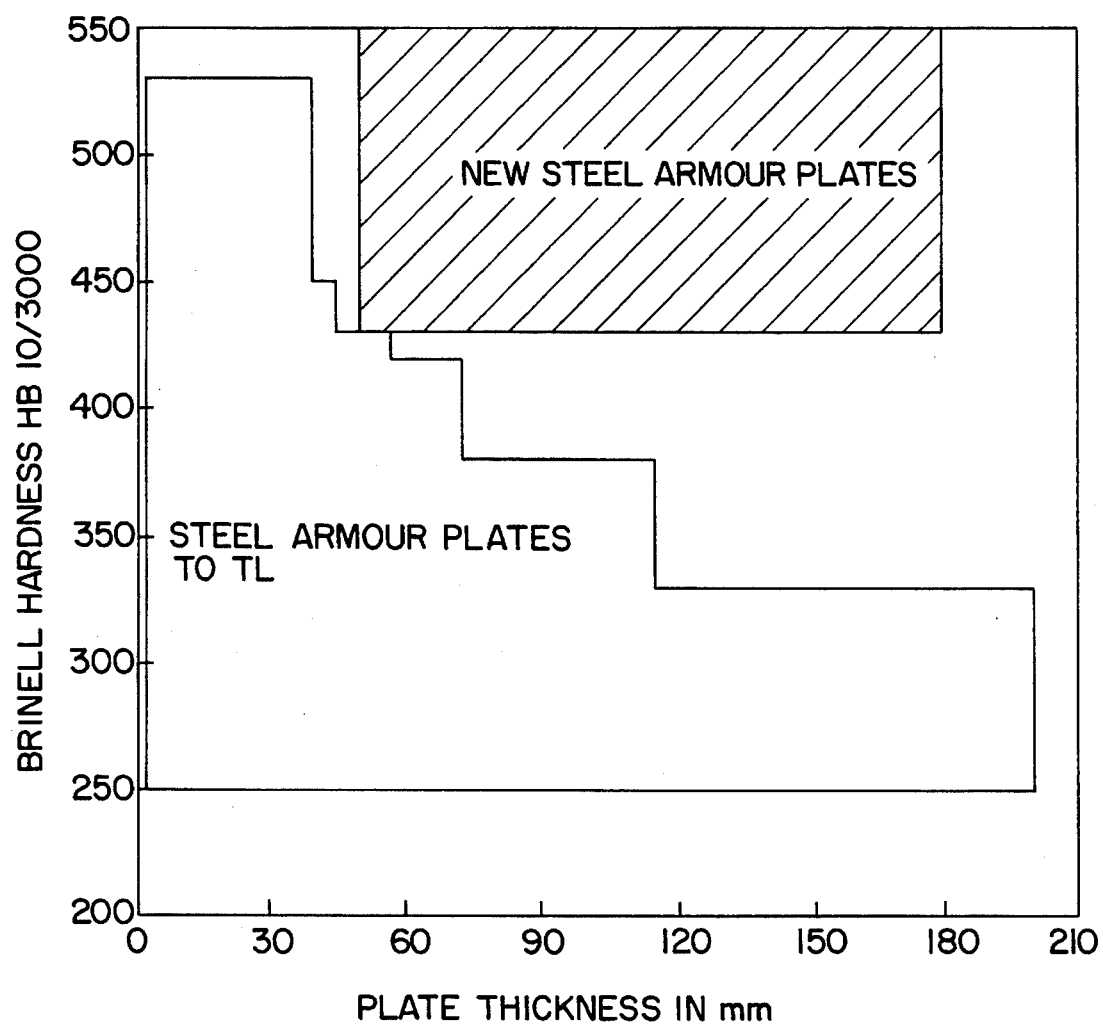

PROCESS FOR THE PRODUCTION OF THICK ARMOUR PLATES

The invention relates to a process for the production of very hard armour plates from steel slabs, wherein the slabs are hot rolled to a final thickness above 50 mm and then hardened and possibly tempered.

It is known to produce armour plates consisting of a homogeneous material with a final thickness above 50 mm. Hitherto in practice only thicker plates with comparatively low and medium degrees of hardness have been used, to obtain the required security against cracking under shell fire—i.e., to prevent an unsatisfactorily large amount of breaking or tearing open or the splintering of such armour plates. For example, armour plates in use which have a final thickness in the range of approximately 70 to 115 mm have a maximum hardness of 380 HB (Brinell hardness). Armour plates having a thickness in the range of 115 to 200 mm have a maximum hardness of 330 HB, as shown in FIG. 1 with reference to the hardness values associated with plate thicknesses in the Federal Army Technical Delivery Conditions for Armour Steel, TL 2350-001, April 1980 and TL 2350-0000, November 1990.

A known step for improving the shell resistance of armouring is so to produce armour plates from homogeneous material that the top and bottom sides of the plates are given a different hardness by a suitable tempering annealing treatment (DE 32 09 531 A1).

It is also known to produce armour plates of enhanced shell resistance from inhomogeneous materials, two or more steels of different hardenability being connected to one another by cladding (EP-Al 0 142 042). In these two-layer steels having a preferred final thickness of less than 20 mm, preferably less than 15 mm, a suitable heat treatment is used to give one side, usually the one turned towards the projectiles, a high hardness of up to 720 HB, while the other side is given a hardness of up to 520 HB. A comparatively less hard part (basic material) ensures the maintenance of the necessary resistance to cracking, while the hard part (cladding) is required to achieve enhanced shell resistance. Even clad armour plates having high degrees of hardness are in practice preferably used exclusively only in plate thicknesses up to approximately 40 mm.

Another step for improving the shell resistance of armouring is to build up the armouring in a number of layers of known homogeneous or clad armour sheets, preferably with a final thickness of up to 40 mm. This is done in a compact form without gaps, either in the form of lamellar armouring of a number of steel plates or as composite armouring of steel plates combined with other metallic or non-metallic materials, or in a compartmented form with intermediate spaces of materials which have little relevance, if any, in protective techniques (DE 40 31 550 A1. Compact or compartmented composite armourings are as a rule very complex in construction, since some of the non-ferrous materials are cost-intensive, so that the armourings are also expensive in relation to the increased protection achieved and to the improvement actually achieved in shell resistance.

It is the object of the invention to provide the process for the production of armour plates having a final thickness above 50 mm and a hardness of more than 430 HB, preferably a hardness of more than 400 HB with a final thickness above approximately 75 mm, to improve the shell resistance of armourings produced therefrom.

This problem is solved according to the invention in the process of the kind specified by the features that first a continuously cast slab is produced consisting of a steel having
  0.25 to 0.32% C
  0.05 to 0.75% Si
  0.10 to 1.50% Mn
  0.90 to 2.00% Cr
  0.10 to 0.70% Mo
  1.20 to 4.50% Ni
  0.01 to 0.08% Al
    max 0.015% P
    max 0.005% S
    max 0.012% N
  residue Fe, including usual impurities,
the slab then being heated to a temperature of 1150° C. or higher and heated through,
whereafter following cooling in air and by the spraying of its two wide sides with pressurized water to a temperature below 1050° C.
the slab is hot rolled at a surface temperature in the range of 1050° to 900° C. with shaping passes having an individual deformation of $\epsilon_h > 0.1$ and with a shape factor SF>0.40 to the final thickness.

The steel can also be alloyed singly or in combination with
  0.001 to 0.004% B
  max 0.10% Ti
  max 0.050% Nb
  max 0.10% V.

Preferably according to the invention the titanium content of the steel is adapted to its particular nitrogen content in accordance with the relation:

$$\% \text{Ti} = (3 \text{ to } 7) \times \% \text{ N},$$

preferably $$\text{Ti} = (4 \text{ to } 7) \times \% \text{ N},$$

to fix said nitrogen content to the maximum extent.

The continuously cast slab is hot rolled to a final thickness in the range of >50 to 200 mm, preferably to 180 mm. The thickness of the continuously cast slab should permit the application of at least three shaping passes according to the invention to reach the final thickness of the armour plate rolled therefrom. Furthermore, the last of the shaping passes applied should preferably be performed with the highest possible individual changes in shape. By the process according to the invention, therefore, in the production of armour plates having a thickness in the range of approximately 50 to 100 mm, the last forming passes are preferably performed with individual changes in shape of up to $\epsilon_h = 0.2$ and above.

Preferably the continuously cast slab is heated to a temperature in the range of 1150° to 1300° C. and heated through. Then the through-heated continuously cast slab is cooled according to the invention in air and by the spraying of its two wide sides with compressed water to a surface temperature of lower than 1050° C. Preferably cooling is so performed that starting from the surface of the two wide sides of the slab, the through-heated temperature is maintained from a depth of more than ⅛ of the slab thickness to a maximum ¼ of slab thickness. As a result, two more solid shells with an inner, softer core are produced on the two wide sides of the continuously cast slab. This means that due to this preferable cooling according to the invention of the slab prior to hot rolling, the thickness of the two outer, more solid shells lies in the range of ⅛ to ¼ of slab thickness. As a result, with the subsequent hot rolling according to the invention the required great hardness and optimum shaping of the slab (plate) core are achieved.

An essential feature of the process according to the invention is that the armour plates are hot rolled from the continuously cast plates with as few shaping passes as possible with as large an individual deformation as possible $$\epsilon_h = (h_o - h_1)/h_o$$

and with as large a shape factor SF>0.40, preferably>0.50 as possible, as a measurement of the shaping distribution over slab thickness with $$SF = \frac{2\sqrt{R(h_o - h_1)}}{h_o + h_1}$$

$h_o$=rolling stock thickness before each shaping pass
$h_1$=rolling stock thickness after each shaping pass
R=roll radius.

Between the shading passes it is permissible to use smoothing passes with a deformation $\epsilon_h$ of the order of magnitude of 0.05 and preferably lower, with the fine adjustment of plate width, flatness and final thickness.

The reversing hot rolling of the armour plates is performed without pause. If necessary, the surface temperature of the rolling stock can be maintained in the required temperature range of 1050° to 900° C. between the individual shaping passes by air and/or sprayed water. This means that the surface temperature remains within this range throughout the hot rolling operation.

According to the invention after cooling to room temperature, the armour plate finish rolled to the final thickness is hardened by reheating to above Ac3 and quenching at a rate of ≧1 K/sec in oil or water.

By a tempering-annealing treatment in the temperature range of 100° to 500° C., the hardness can be adjusted in the range of 400 to 550 HB, while it can preferably be adjusted in the range of 430 to 550 HB in the temperature range of 100° to 400° C. The hardness adjusted depends on the temperature selected for the tempering-annealing treatment.

BRIEF DESCRIPTION OF THE DRAWINGS

FIG. 1 indicates the preferable location of an armour plate produced by the process according to the invention with regard to its thickness and hardness in a graph representing Brinell hardness in dependence on plate thickness for conventional armour plates. Thus, hitherto considerable hardness values have been achieved only with relatively thin plates below 50 mm in thickness, while thicker plates were always produced and used with a lower hardness between 250 and a maximum 430 HB. The plate produced by the process according to the invention is clearly distinguished from these known armour plates by the combination of considerable hardness (above 400 HB, more particularly above 430 HB) with considerable plate thickness (above 50 mm or 75 mm).

Using the process according to the invention, two steel melts A and B having the combination shown in Table 1 were prepared. Table 2 shows in each case for two tests using the two steel melts A and B the following manufacturing parameters: the thickness of the continuously cast slab produced, the through-heating temperature, the cooling treatment at the surface of the through-heated continually cast slab shortly prior to hot rolling, and the roll radius. Table 2 also contains for the individual passes during hot rolling: the surface temperature, the particular thickness $h_1$ of the rolled product, the value of the individual change in shape $\epsilon_h$ calculated therefrom and the shade factor SF.

Table 3 shows the mechanical properties after the hardening and tempering of hardened armour plates produced by the process according to the invention, namely the Brinell hardness, measured at the plate surface, and the values measured in the longitudinal and transverse directions adjacent the surface and in the core of the armour plates produced from melts A and B. After hardening, the plates had been tempered at a temperature of 180° to 250° C., so that a considerable hardness, lying as little as possible below cracking hardness, had been set up.

The results clearly show that the armour plates according to the invention have a high measure of homogeneity over plate thickness and of isotropy longitudinally and transversely of the rolling direction. They have the required considerable hardness and the corresponding high tensile strength over the whole plate thickness. The values measured at surface and core fluctuate within the range of measuring accuracy. The notched bar impact work, determined on Charpy V samples at −40' C., reaches a level unusually high for steel armour plates of this thickness. The plate surface and core show uniformity in toughness behaviour. The differences in properties longitudinally and transversely of the rolling direction are very slight as regards both tensile strength and notched bar impact work.

The novel homogeneous very thick and very hard armour plates produced by the process according to the invention are able to improve the shell resistance of single-layer and more particularly multi-layer armourings. Taking the depth of penetration of a shell into a lamellar target of conventional armour plates as, for example, 100%, with the use of the armour plates according to the invention the depth of penetration is reduced by at least 20% as a rule by 30% and more.

As multi-layer compact and compartmented armourings produced by the process according to the invention show, the shell resistance and therefore the protective effect of such armourings is increased more particularly if, for equal final thickness of the armouring, referred to the individual plates a changeover is made not only to larger plate thicknesses, but at the same time to higher degrees of hardness also.

The quality of an armouring is decided by the combination of mass and shade. As such, or combined with other materials, the new very hard thick armour plates provide simple and comparatively cheap possibilities for effective protective structures against the most various kinds of serious threats by both heavy shells and also shaded charges. Due to the novel material quality, which shows itself more particularly in highly dynamic stressing by shells, appreciably lighter constructions can be produced for the same shell resistance. At the same time, the smallest possible overall depths can be constructed.

TABLE 1

| | Melt analysis (proportions in % by weight) | | | | | | | | | | | |
|---|---|---|---|---|---|---|---|---|---|---|---|---|
| Melt | C | Si | Mn | P | S | Cr | Ni | Mo | N | Al | B | Ti |
| A | 0.27 | 0.19 | 0.26 | 0.008 | 0.001 | 1.38 | 3.52 | 0.40 | 0.004 | 0.050 | — | — |
| B | 0.30 | 0.20 | 0.23 | 0.011 | 0.001 | 1.35 | 3.46 | 0.40 | 0.005 | 0.026 | 0.002 | 0.03 |

TABLE 2

ROLLING DATA

| Melt: B | | | | A | | | | A | | | | B | | | |
|---|---|---|---|---|---|---|---|---|---|---|---|---|---|---|---|
| Heating temperature: 1200° C. | | | | 1180° C. | | | | 1230° C. | | | | 1150° C. | | | |
| Slab cooling: 20s/L + 4s/W + 20s/L | | | | 20s/L + 5s/W + 40s/L | | | | 20s/L + 5,5s/W + 20s/L | | | | 20s/L + 5s/W + 40s/L | | | |
| Surface temp 1010° C. after cooling | | | | 1020° C. | | | | 980° C. | | | | 980° C. | | | |
| Slab thickness: 260 mm | | | | 255 mm | | | | 255 mm | | | | 260 mm | | | |
| Plate thickness: 70 mm | | | | 90 mm | | | | 100 mm | | | | 120 mm | | | |
| Roll radius R = 450 mm | | | | 450 mm | | | | 450 mm | | | | 450 mm | | | |
| Pass | T °C. | εh mm | h | S.F. | T °C. | h mm | εh | S.F. | T °C. | h mm | εh | S.F. | T °C. | h mm | εh | S.F. |
| 1 | 1029 | 232.0 | 0.107 | 0.45 | 1036 | 244.1 | (0.042) | | 1007 | 249.6 | (0.039) | | 1000 | 229.1 | 0.101 | 0.44 |
| 2 | 1023 | 205.9 | 0.112 | 0.49 | 990 | 210.9 | 0.136 | 0.53 | 1029 | 221.1 | 0.114 | 0.48 | 977 | 204.3 | 0.108 | 0.48 |
| 3 | 1020 | 201.9 | (0.019) | | 990 | 181.4 | 0.139 | 0.58 | 1029 | 190.9 | 0.136 | 0.56 | 977 | 174.3 | 0.146 | 0.61 |
| 4 | 1025 | 181.7 | 0.100 | 0.49 | 965 | 151.7 | 0.163 | 0.69 | 1013 | 161.5 | 0.154 | 0.65 | 977 | 144.7 | 0.169 | 0.72 |
| 5 | 1007 | 162.5 | 0.105 | 0.54 | 965 | 122.3 | 0.193 | 0.83 | 1013 | 130.5 | 0.191 | 0.80 | 977 | 124.0 | 0.143 | 0.71 |
| 6 | 1004 | 136.9 | 0.157 | 0.71 | 965 | 99.6 | 0.185 | 0.91 | 1026 | 109.4 | 0.161 | 0.81 | | | | |
| 7 | 1002 | 106.8 | 0.219 | 0.95 | 985 | 93.7 | (0.059) | | 921 | 102.9 | (0.059) | | | | | |
| 8 | 1000 | 77.0 | 0.279 | 1.26 | | | | | | | | | | | | |
| 9 | 994 | 72.1 | (0.063) | | | | | | | | | | | | | |
| 10 | | | | | | | | | | | | | | | | |
| 11 | | | | | | | | | | | | | | | | |
| 12 | | | | | | | | | | | | | | | | |

L = Air cooling, W = Pressurized water cooling; ( ) = Smoothing pass

TABLE 3

| | | | Surface | | | | Core | | | |
|---|---|---|---|---|---|---|---|---|---|---|
| | Plate | Brinell | Long. | | Trans. | | Long. | | Trans. | |
| Melt | thickness | hardness | RM* | AV** | RM* | AV** | RM* | AV** | RM* | AV** |
| B | 70 mm | 510 | 1665 | 29 | 1700 | 25 | 1650 | 29 | 1695 | 35 |
| A | 90 mm | 485 | 1610 | 48 | 1605 | 40 | 1590 | 45 | 1605 | 37 |
| A | 100 mm | 480 | 1595 | 50 | 1600 | 45 | 1565 | 39 | 1590 | 38 |
| B | 120 mm | 500 | 1680 | 35 | 1685 | 33 | 1725 | 29 | 1615 | 27 |

Mechanical properties after hardening and tempering[1]

[1] Tempering temperature: 180 to 250° C.
*RM: tensile strength (N/mm$^2$), determined on B 10 × 50 standard samples
**AV: notched bar impact work (J), determined on Charpy V samples at −40° C.

We claim:
1. A process for producing very hard armour plates from steel slabs, comprising producing a cast slab having the following composition:
0.25 to 0.32% C
0.05 to 0.75% Si
0.10 to 1.50% Mn
0.90 to 2.00% Cr
0.10 to 0.70% Mo
1.20 to 4.50% Ni
0.01 to 0.08% Al
max 0.015% P
max 0.005% S
max 0.012% N
residue Fe, including usual impurities, heating said cast slab until it has a throughgoing temperature of at least 1150° C., cooling said cast slab until it has a surface temperature below 1050° C., and hot rolling said cast slab at said surface temperature in the range of 1050° to 900° C. with shaping passes having an individual deformation of $\epsilon_h > 0.1$ and with a shape factor SF> 0.40 to a final thickness above 50 mm.

2. The process according to claim 1 wherein said cast slab is cooled in air and is sprayed at its two wide sides with pressurized water.

3. The process according to claim 1 wherein said cast slab is alloyed in said producing step with at least one of the following 0.001 to 0.004% B
max 0.10% Ti
max 0.050% Nb
max 0.10% V.

4. The process according to claim 3 wherein said titanium content of said cast slab conforms to the following relation:

$$\% Ti = (3 \text{ to } 7) \times \% N.$$

5. The process according to claim 3 wherein said titanium content of said cast slab conforms to the following relation:

$$\% Ti = (4 \text{ to } 7) \times \% N.$$

6. The process according to claim 1 wherein said cast slab is hot rolled to a final thickness in the range >50 to 200 mm.

7. The process according to claim 1 wherein said cast slab is hot rolled to a final thickness of 180 mm.

8. The process according to claim 1 wherein said cast slab is heated to a throughgoing temperature in the range of 1150° to 1300° C.

9. The process according to claim 1 wherein the surface of said cast slab is cooled in said cooling step, starting from its two wide sides to a depth of a maximum ¼ of its total thickness while its inner core is maintained at said throughgoing temperature.

10. The process according to claim 1 wherein said hot rolling is performed with a shape factor SF>0.50.

11. The process according to claim 1 further comprising after said hot rolling step cooling said cast slab to room temperature, reheating above Ac3 to harden said cast slab, and quenching at a rate of ≧1 K/sec in oil or water.

12. The process according to one of claims 1 to 11 further comprising tempering said cast slab in the temperature range of 100° to 500° C., thereby to adjust the hardness to a range of 400 to 550 HB.

13. The process according to claim 12 wherein during said tempering step, the hardness of said cast slab is adjusted to a range of 430 to 550 HB at a temperature of 400° C.

* * * * *